Aug. 4, 1970 G. I. COHN 3,522,531
ELECTRIC FIELD INTENSITY INDICATOR EMPLOYING A VIBRATORY
CONDUCTOR SENSOR
Filed July 26, 1966

INVENTOR.
GEORGE I. COHN
BY
Sellers & Bace
ATTORNEY

United States Patent Office 3,522,531
Patented Aug. 4, 1970

3,522,531
ELECTRIC FIELD INTENSITY INDICATOR EMPLOYING A VIBRATORY CONDUCTOR SENSOR
George I. Cohn, 915 Monarch Drive,
Pasadena, Calif. 91103
Filed July 26, 1966, Ser. No. 567,906
Int. Cl. H01g 7/00; G01r 5/28
U.S. Cl. 324—72                                   8 Claims

ABSTRACT OF THE DISCLOSURE

An electric field intensity indicator for use on spacecraft and like structures whereon protruding objects are undesirable or not permissible, comprising a tensioned conductor disposed flush with the surface of the structure in an elongated slot therein, the conductor being vibrated so as to bow into and out of the ambient electric field adjacent the slot to induce a fluctuating potential in the conductor relative to a reference provided by the structure, and means utilizing the fluctuating potential to produce an indication of the intensity of the potential.

---

The invention herein disclosed pertains to means for indicating or measuring the electrostatic field intensity in an environment, and more particularly it pertains to improved means for measuring the intensity of the ambient electrical field adjacent a spacecraft.

Modern electric-field intensity measuring arrangements have evolved principally from two basic forms of electrometers. One, termed the attracted-disc electrometer, measures the force exerted by the field on a disc perpendicularly to the disc surface. The second form termed the quadrant electrometer and invented by Lord Kelvin, utilizes a suspended paddle which is rotatable in a metallic chamber divided into quadrants each of which is insulated from its next adjacent neighbor quadrants. Potential difference applied to next adjacent quadrants develops a torque tending to rotate the conductive paddle.

In modern electrometers the force exerted by the electric field is not used to cause movement of a movable part. Rather, movement, usually oscillatory, is imparted to an element exposed to the field by power-operated means; and the shifting of the field, or a part of it, to and from the oscillating element is detected and translated into an indication of the intensity of the field. A recently used example of the latter type of field machine is one in which a metallic disc is oscillated mechanically outwardly and inwardly within an aperture in the metallic skin of a spacecraft or some extension thereof. The peripheral edge of the disc is closely adjacent the edge of the skin around the aperture, and as the disc moves outwardly an increasing number of electrostatic lines of force terminate on the disc. As the disc reverses and moves inwardly to a position interiorly of the skin, electrostatic lines of force previously terminating close to the edge of the disc migrate and terminate on the skin proper. Thus as the disc oscillates, an alternating potential difference is apparent between the disc and the skin, the two being out of mutual contact and insulated from each other. Since lines of force migrate to and from the disc mostly at the circular zone adjacent the disc edge, the noted electrometer is characterized by the disadvantage of requiring that a relatively large metal disc be oscillated to produce an alternating potential difference of a desired value. Further, relatively heavy oscillator means, such as a motor-driven mechanism, are required with the inevitable consequence that the power requirement is rather high.

As is well known, reduction of mass, spatial dimensions, and power requirements are prime objectives in the design and manufacture of spacecraft and spacecraft equipment. In accord with those objectives, the present invention provides novel improvements in electrometers of the type adapted to sense and indicate or measure the value of the ambient electric field at the exterior of a spacecraft, which improvements not only greatly reduce the mass and space requirements and power requirements but which permit more accurate measurement of the electric field intensity. According to the invention, essentially a zone within which electrostatic lines-of-force terminations migrate between a fixed part of the skin and an insulated oscillatory conductive body thereadjacent is provided by a narrow slot in the skin, within which slot an elongate narrow oscillatory conductive member, for example a taut vibratory wire or the like conductive member, is disposed for oscillation in a plane normal to the spacecraft surface. As will be immediately apparent to those skilled in the arm, by thus disposing two edge surfaces of the spacecraft skin closely adjacent the oscillatory conductive member, the effective zone for oscillatory migration of lines of force is doubled in extent. Also the mass required to be oscillated is grossly reduced thus concurrently grossly reducing the power required to oscillate the conductor. Substantially all friction losses are eliminated. Further, by using a taut wire or the like as the oscillatory conductive member, the rate or frequency of vibration is readily made much higher than that of the prior art disc which greatly facilitates measurement of the field intensity.

As will also be evident, since vibration of a taut wire can be achieved and maintained at a resonant frequency and the resonant frequency can be adjusted, the power required and the mass of the driving means for oscillating the wire may be still further reduced by utilizing resonance. Also, it will be evident to those skilled in the art that the effective alternating potential difference effect produced may be enhanced by utilizing a plurality of oscillatory conductors such as vibrating wires each in its respective slot-like aperture in the conductive skin of the craft, vibrating all in unison, and connecting the conductors in additive electrical relationship. As will be pointed out, by this latter technique all of the electrostatic lines of force terminating either on taut sensor wires closely parallel to the vibrating wires or on an area of the spacecraft skin can be made to migrate to and from a series of parallel closely spaced wires each disposed in a slot aperture in the skin, whereby accuracy of the indication is improved and extraneous effects such as electrical "noise" effects are reduced in magnitude relative to the desired component of the signal.

According to the invention, alternate ones of a series or group of parallel taut wires may be vibrated oppositely to the intervening taut wires, that is, so that alternate wires are moving inwardly while intervening wires are moving outwardly and vice-versa, all of the wires being disposed in the same single aperture in the skin. In that arrangement, terminal ends of electrostatic lines of force shift or migrate to and from alternate wires, from and to the intervening wires. Thus the intervening wires, in effect, replace narrow strip-like portions of the spacecraft skin, or an extension thereof housing the invention sensor, and the shifting or migration of ends of lines of force is enhanced because of the greater effective relative displacement of next adjacent conductive members. It will be recognized that any reference herein to spacecraft skin is also intended to include the skin housing the sensor where protruding beyond the spacecraft surface. It will also be understood that a pair of taut wires spaced closely beside the vibrated wire may be employed in lieu of the skin surface as the electrostatic field sensor, and is the type illustrated in the accompanying drawings. It will therefore be understood that either the adjacent skin or the taut wires may be used as the field intensity sensor. Vibration of the wire or wires may be induced or caused by any suitable means, but is preferably caused by positioning the wire or wires in a magnetic field and passing appropriate electric current through the wire or wires.

According to the invention, the polarity of the ambient electrostatic field is determinable by occasionally switching the conductors to a potential source of known polarity, at a known or predetermined time. Obviously such reference to a known standard or polarity may be effected by automatically-acting means or by controllable means, as may suit the requirements in a given or prescribed situation.

The preceding explanation of prior art practices and means and brief explanation and description of the present invention makes it evident that a principal object of the invention is to provide novel improvements in means and modes of determining the intensity of the ambient electrostatic field adjacent a craft or the like object.

Another object of the invention is to reduce the mass of means for indicating the intensity of an electrostatic field.

Another object of the invention is to reduce the power required for indicating the intensity of an electrostatic field.

Another object of the invention is to provide a simple and effective means for indicating the intensity of an electostatic field.

Another object of the invention is the provision of an electrostatic field intensity meter of greater sensitivity for a given size and weight and one far less prone to generate false and spurious signals.

Another object of the invention is the provision of an electrostatic field intensity meter is substantially less sensitive to distractive operating environment factors productive of false signals such as ambient vibrations, flux fields on charged particles encountered in space and particularly in the ionosphere, and neutral particles and/or photons.

Another object of the invention is the provision of a high sensitivity electrostatic field intensity meter which is less sensitive to the adverse influence by plasmas sheath.

Other objects and advantages of the invention will be made evident or set forth in the following detailed description and appended claims, the description being of a preferred form of apparatus embodying the principles of the invention and the apparatus being illustrated in exemplary form in the accompanying drawings forming a part of this specification.

Referring now to the drawings in which a preferred embodiment of the invention is illustrated:

Figure 2:
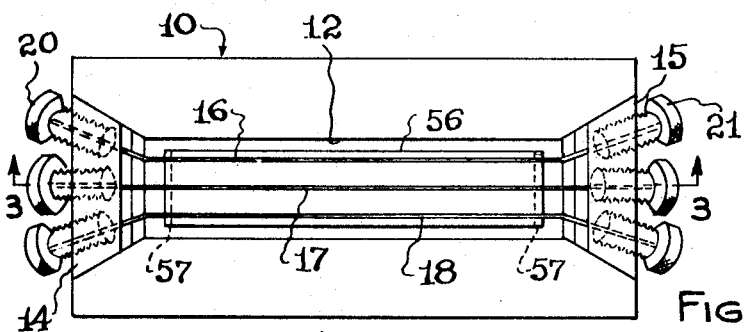
FIG. 2 is a face view of means for supporting a vibratory wire and a pair of sensor wires.
Figure 3:
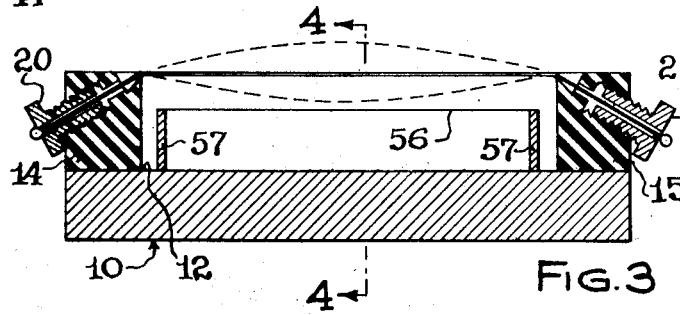
FIG. 3 is a sectional view taken as indicated by the broken line and arrows 3—3 on FIG. 2.
Figure 4:
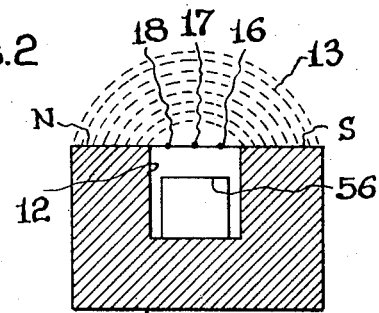
FIG. 4 is a transverse sectional view of structure depicted in FIG. 2, the section being taken as indicated by the broken line and arrows 4—4 on FIG. 3.

Referring first to FIGS. 2, 3 and 4, a powerful magnetic field is provided by a permanent magnet 10, preferably of U-shaped cross-section and of elongate configuration so that an elongate trough-like recess 12 is formed with the external magnetic field 13 directed transversely between magnetic poles N and S, as indicated in FIG. 4. Insulative bridge members or blocks 14, 15, preferably of quartz and shaped as indicated in FIGS. 2 and 3, are disposed and secured in the ends of recess 12.

As there illustrated, a single vibratory wire 17 is employed between a pair of closely spaced field intensity sensor wires 16 and 18. All three wires are stretched over the bridge members and between respective pairs of anchorages such as adjustable screw anchors 20, 21 fitted in threaded apertures in bridge members 14, 15, as is best shown in FIG. 3. These wires, of alloy or material having high tensile strength and appropriate temperature coefficient of expansion, are drawn taut transversely of the magnetic field 13 extending between magnet poles N and S. A wire length of one inch between the bridge supports and a diameter of several mils, as for example 3 to 10 mils, is found to provide excellent results. The wires are spaced apart sufficiently to avoid contact through lateral displacement, a practical distance being between one-third and three times the diameter of vibrating wire 17.

It is evident that if an electric current is caused to flow through taut wire 17 this wire will tend to be deflected in a direction at right angles to that of the magnetic field, the deflection being inwardly of recess 12 if the current flows in one direction and outwardly of recess 12 if the current flows in the opposite direction, all in accord with basic laws of electromagnetics. Also, if alternating current is used, the wire will in either case alternately tend to deflect into and out of the channel or recess 12. In this manner the wire may be made to vibrate in respective planes perpendicular to the magnetic field by utilizing alternating current (A.C.) excitation; and it is evident that by using more than one wire 17 and passing the current through next adjacent wires in opposite directions at any instant, those wires will vibrate oppositely.

Figure 1:
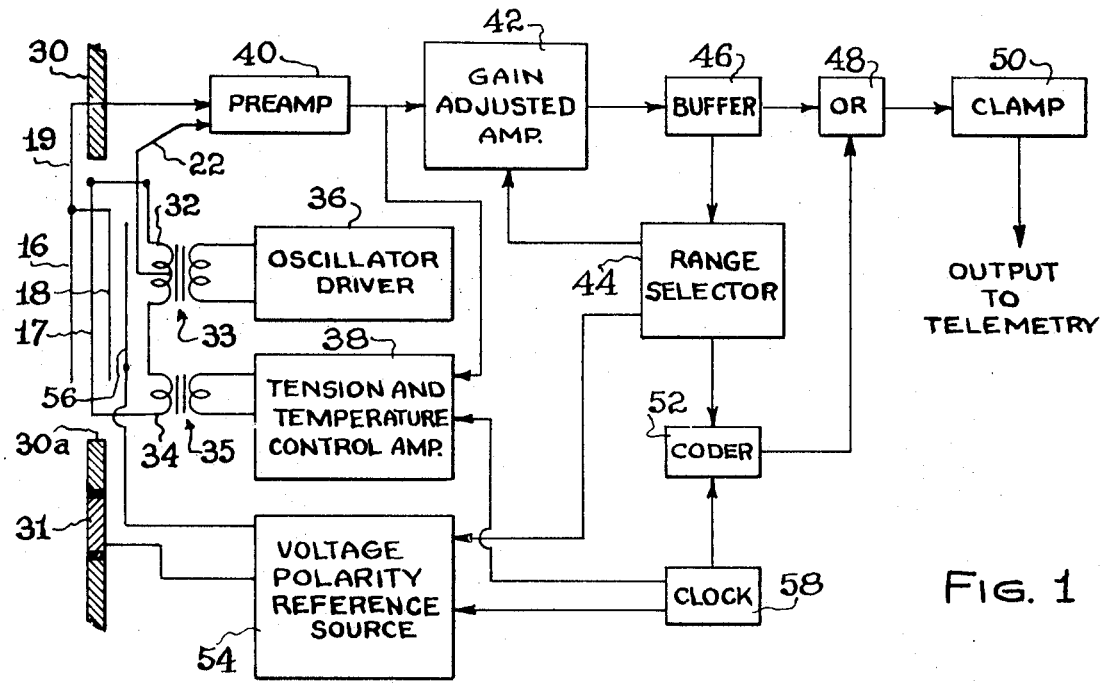
FIG. 1 is a diagrammatic representation showing a portion of the conductive skin of a spacecraft, an aperture therein, means according to the invention disposed at the aperture, and functional block-diagram representations of components of the exemplary apparatus.

In FIG. 1, a vibratory wire, such as 17, electrostatic field sensor wires 16, 18, and the associated mounting and magnet means therefor are represented as disposed in aperture 30a through the outer skin 30 of a spacecraft. The mounting and magnet means are deleted from the figure in the interest of clarity of illustration, but are disposed with the plane of the wires substantially coincident with the plane of the adjacent outer surface of skin 30 and with the magnet and supporting structure fixed relative to skin 30, and so that the magnet pole surfaces form a continuation of the skin surface or such that they are just inward of the skin surface with the sides of channel 12 aligned with the edge surfaces of the skin at aperture 30a. Conductors connect ends of the wire to a series circuit comprising the secondary 32 of a driving transformer 33 and with the secondary 34 of a temperature-control transformer 35, whereby A.C. power for vibrating the wire at a suitable frequency as, for example, 4 or 5 kc. is supplied by an oscillator driver 36 through the primary of transformer 33 and whereby the temperature of the wire may be maintained at a desired constancy by heating power supplied to the wire through transformer 35 from a tension and temperature control amplifier unit 38. This is preferably accomplished by designing the equipment so that the vibrating wire operates normally at the highest ambient temperature to be encountered and utilizing the temperature control amplifier 38 to maintain the wire at this temperature irrespective of the ambient temperature. If there are a plurality of wires 17, they may be connected either in series or in parallel with each other. According to one arrangement utilizing multiple wires, alternate wires would remain stationary and the remainder would be connected to vibrate in unison. And in a second arrangement, one set of alternate wires would be connected to vibrate oppositely to the other set. In the interest of simplicity, only one of the wires 17 is depicted in FIG. 1.

Continuing with reference to FIG. 1, the alternating potential difference between the vibrating wire 17, for example, and wires 16, 18 to either side thereof, produced by the previously explained charge variation on the wire or migration of terminations of electric lines of force to and from the wire, may be transferred by conductors 19, 22 to a preamplifier unit 40 via a mid-tap to secondary 32 of transformer 33. The output signal of preamplifier unit 40 may be translated to an adjustable-gain amplifier unit 42 whose gain may be adjusted by means of a range selector unit 44, and the amplified signal may be translated through a buffer unit 46 and a logical OR gate 48 to telemetry apparatus via limiting clamp circuit unit 50. The gain of unit 42 can be adjustable to accommodate a large dynamic range, for example $10^{-2}$ to $10^5$ volts/cm., of electric field input signal. The output of unit 42 can be sensed by the range selector unit 44, and if the signal is too high or too low an appropriate control signal is generated by unit 44 to cause switching of the amplifier to the next lower or higher gain range and to cause a coder unit 52 to indicate to the telemetry which gain range is currently being utilized. The range selector unit also controls the voltage supplied by a voltage polarity reference source unit 54 to a reference polarity electrode 56 and an insulated portion 31 of skin 30 connected as indicated. Electrode 56 is a strip supported beneath the wires on insulation pedestals 57 suitably anchored to the magnet in the positions shown in the drawing. The purpose of unit 54 will presently be made evident. A clock unit 58 demarks time intervals and supplies timing and control signals at prescribed intervals to respective ones of units 38, 54 and coder 52 to time operation of those units.

Since the frequency of oscillation or vibration of the wire or wires is dependent upon the wire tension and since the latter is subject to variation with variation of ambient temperature which may vary over a wide range of values, the tension and hence the frequency of vibration may be controlled by passing a heating current through the wire. The frequency of oscillation of the wire or wires is sensed by unit 38, and tendency toward change in frequency results in appropriate increase or decrease of heating current supplied via transformer 34 whereby the tension is regulated to remain substantially constant to keep the frequency of oscillation constant.

The logical OR circuit unit 48 always translates from unit 46 to the telemetry apparatus an output signal representative of the intensity of the electrostatic field adjacent the aperture 30a except when the coder 52 transmits a signal representing the scale of the currently effective range of amplifier unit 42. Signals from clock unit 58 control the time and the polarity of potential applied between electrodes 56 and 31, with concurrent control of coder 52. As is evident, if the polarity of the thus locally created field induced by the applied potential is opposite that of the ambient field, the preamplifier input and output signals will drop during the control signal supplied to unit 54 by clock unit 58; and if the polarities of both fields are the same, the preamplifier signal will increase. Thus an indication of the polarity of the ambient electrostatic field is derived at prescribed clock-controlled times, and the indications are translated to the telemetry apparatus for transmission to a remote station in time-sequence with signals representing the magnitude of the output signal of unit 42 and signals representing the gain setting of unit 42.

As will be evident to those skilled in the art, each of a plurality of taut wires such as 17 may repose in a respective narrow elongate slot in skin 30; or a plurality of such wires all disposed in closely spaced-apart parallel coplanar relationship may be disposed in a manner such as to have terminating thereon electrostatic lines of force of a field to be measured, and in such case alternate wires vibrated contra to the intervening wires. In the latter case, an A.C. potential signal is made apparent on each wire, proportional to the strength or intensity of the adjacent field. Such individual signals can be, in an evident manner, serially added by proper connection of the wires to provide a signal sufficiently strong to render less objectionable such spurious signals as radio-frequency interference, electronic "noise" and the like.

The previously described taut vibratory elongate slender conductive members may be of strong conductive alloy wire such as stainless steel or other material having the requisite characteristics.

Since large capacitive effects between the spacecraft skin or sensor wires 16, 18 and the vibratory means are grossly reduced relative to prior art means, and since mechanical friction is grossly reduced and sliding electrical connections are eliminated, various interference effects are greatly lessened and wear and electrical noise effects are much reduced in magnitude. Since the mass to be moved is greatly reduced, power requirements are reduced; and a field-intensity signal of greatly increased amplitude is attained by the increase of length of the zone in which the electrostatic field alternately changes disposition. However, if desired, the size of the apparatus may be reduced with concurrent reduction in input signal amplitude thus trading signal strength for reduction in size and mass of the apparatus.

The electronic circuitry of such units as 40, 42, 44, 46, 48, 50, 52, etc., is not shown in detail, since each may assume a variety of forms and each unit is conventional per se and not in any particular form essential to the present invention. Selection thereof may be made from commercially available units or built from designs well known to those skilled in this art.

I claim:

1. Electric field intensity indicating apparatus adapted for flush mounting relative to a structural surface and to present no obstruction to movement of the structure through atmosphere and unoccupied space, said apparatus being adapted to sense the electric field immediately adjacent such structural surface, said apparatus comprising:

first means, including a structure providing an extensive electrically conductive surface with an elongate slot therein;

second means, including a set of tensioned slender elongate conductors disposed within said slot in a plane substantially flush with and closely adjacent said surface, said set comprising first, second and third conductors;

third means, including means to cause said second conductor to vibrate in said slot transversely of said surface; and fourth means, including electrical conductors connected respectively to said second conductor and to said first and third conductors, effective to sense and indicate the alternating potential difference between said first and third conductors and said second conductor incident to vibration of the latter to indicate the electric field intensity thereat.

2. Apparatus according to claim 1, in which said third means comprises means to produce a magnetic field transversely of said vibratory conductor and means to pass a pulsating current through the said second conductor.

3. Apparatus according to claim 1, including amplifier means connected to said conductive surface and to said second conductor, effective to amplify the alternating potential apparent therebetween incident to vibration of said second conductor into and out of the electric field adjacent said slot, and telemetry means connected to said amplifier means to transmit signals indicative of the magnitude of said alternating potential.

4. Apparatus according to claim 1 characterized in that said first second and third conductors are parallel and said second conductor is disposed between said first and second conductors.

5. Apparatus according to claim 1, including fifth means effective at prescribed intervals to superimpose a locally-created electrostatic field of predetermined polarity on the ambient electrostatic field and under investigation, at and near said slot whereby at such intervals the polarity of the ambient electrostatic field may be determined by the nature of the change in the magnitude of the alternating potential difference sensed by said fourth means.

6. Electric field intensity indicating apparatus for providing signals representative of the intensity of an ambient electric field, said apparatus comprising:

first means, including a structure presenting a large conductive surface with a long narrow opening therein, and supporting means supporting in said opening substantially flush with the said surface of said structure at least one elongated tensioned vibratory conductor adapted to vibrate a neutral position into and out of the ambient electric field outside said structure adjacent said opening whereby to alternately cause increase and decrease of the electric field flux intercepted by said conductor to create an alternating potential difference between the conductor and an object in said first means providing a reference potential, said first means comprising means to tension said conductor;

second means, including a magnetic device below said opening in said structure, effective to cause said conductor to vibrate as stated; and third means, electrically connected to said conductor and including potential-sensitive means and signal-forming means, effective to sense the alternating potential evidenced on said conductor incident to vibration thereof and to form and transmit a signal representative of the magnitude of the sensed alternating potential difference to provide an indication of the intensity of the ambient electrostatic field.

7. Apparatus according to claim 6 characterized in that said second means includes means to create a magnetic field transversely across at least a portion of the vibratory portion of said conductor and generally perpendicular to the directions of vibration thereof and means for passing alternating current through the conductor to cause vibration of the latter due to interaction of the created magnetic fields.

8. Apparatus according to claim 6, including fourth means for creating at prescribed intervals a local electric field of predetermined polarity adjacent said first means and superposed on the said ambient electrostatic field, whereby to indicate by change of magnitude of the sensed alternating potential difference on said conductors the polarity of the ambient electrostatic field.

References Cited
UNITED STATES PATENTS

| | | | |
|---|---|---|---|
| 2,820,947 | 1/1958 | Gunn | 324—72 |
| 3,253,207 | 5/1966 | Jauch | 324—72 XR |
| 3,375,439 | 3/1968 | Yamamoto | 324—34 |

OTHER REFERENCES

Review Scientific Instruments, "Vibrating Probe Electrometer for the Measurement of Bioelectric Potentials" (Bluh et al.), vol. 21, No. 10, October 1950, p. 867.

RUDOLF V. ROLINEC, Primary Examiner

E. L. STOLARUN, Assistant Examiner

U.S. Cl. X.R.

317—246; 324—32